United States Patent
Adams et al.

(10) Patent No.: US 10,754,965 B2
(45) Date of Patent: Aug. 25, 2020

(54) DATA MESSAGING WITH PRIVACY TOKENS

(71) Applicant: BlackBerry Limited, Waterloo (CA)

(72) Inventors: Neil Patrick Adams, Waterloo (CA); Jeremy Lawson Kominar, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 151 days.

(21) Appl. No.: 15/453,537

(22) Filed: Mar. 8, 2017

(65) Prior Publication Data
US 2018/0260577 A1    Sep. 13, 2018

(51) Int. Cl.
| | |
|---|---|
| H04L 29/06 | (2006.01) |
| H04L 29/08 | (2006.01) |
| G06F 21/62 | (2013.01) |
| H04W 12/08 | (2009.01) |
| G06T 5/00 | (2006.01) |
| H04W 12/02 | (2009.01) |
| G06F 3/041 | (2006.01) |
| G06K 9/00 | (2006.01) |

(52) U.S. Cl.
CPC ...... *G06F 21/6209* (2013.01); *G06F 21/6245* (2013.01); *G06T 5/002* (2013.01); *H04L 63/04* (2013.01); *H04L 63/10* (2013.01); *H04L 67/146* (2013.01); *H04W 12/02* (2013.01); *H04W 12/08* (2013.01); *G06F 3/041* (2013.01); *G06F 2221/2145* (2013.01); *G06K 9/00442* (2013.01); *H04L 63/0471* (2013.01)

(58) Field of Classification Search
CPC ..... G06F 21/6209; G06F 3/041; G06T 5/002; H04L 67/146; H04L 63/10; H04W 12/08
USPC .............................................. 726/26, 27, 30
See application file for complete search history.

(56) References Cited

U.S. PATENT DOCUMENTS

| | | | |
|---|---|---|---|
| 5,801,697 A | 9/1998 | Parikh et al. | |
| 6,757,713 B1 | 6/2004 | Ogilvie et al. | |
| 7,779,475 B2* | 8/2010 | Jakobson ................. | G06F 21/62 726/26 |
| 7,912,908 B2 | 3/2011 | Cai et al. | |
| 8,781,838 B2 | 7/2014 | Krause | |
| 8,844,028 B1* | 9/2014 | Cheng ..................... | H04L 29/06 726/22 |

(Continued)

FOREIGN PATENT DOCUMENTS

WO    2015148441    10/2015

OTHER PUBLICATIONS

Extended European Search Report for European Application No. 18157473.2 dated Jun. 7, 2018.

(Continued)

*Primary Examiner* — Jahangir Kabir
(74) *Attorney, Agent, or Firm* — Jeffrey N. Giunta; Fleit Intellectual Property Law

(57) ABSTRACT

A system and method for protecting presented content text from unauthorized perception. A message comprising presentable data defining presentable content is received. A presence of a privacy indication token within the presentable data is determined. Based on determining the presence of the privacy indication token within the presentable data, a presentation privacy filter is applied to presentations of the presentable content.

19 Claims, 7 Drawing Sheets

(56) References Cited

U.S. PATENT DOCUMENTS

| | | | |
|---|---|---|---|
| 8,856,948 B1* | 10/2014 | Robison | G06F 21/60 |
| | | | 726/26 |
| 9,235,711 B1 | 1/2016 | Xavier | |
| 9,558,365 B1 | 1/2017 | Baker et al. | |
| 10,263,970 B1* | 4/2019 | Yoches | G06F 21/6245 |
| 2013/0179985 A1* | 7/2013 | Strassmann | G06F 21/60 |
| | | | 726/26 |
| 2014/0201527 A1 | 7/2014 | Krivorot | |
| 2015/0371049 A1* | 12/2015 | Xavier | G06T 11/60 |
| | | | 726/26 |
| 2016/0261532 A1 | 9/2016 | Garbin et al. | |
| 2016/0360152 A1 | 12/2016 | Karimi-Cherkandi et al. | |
| 2018/0121397 A1* | 5/2018 | Kominar | G09C 5/00 |

OTHER PUBLICATIONS

Asterino, M., "How Do I Send Disappearing Messages on my iPhone? Invisible Ink!", Sep. 10, 2016 (https://www.payetteforward.com/how-do-i-send-disappearing-messages-on-my-iphone-invisible-ink/, pp. 1-3.).

Communication pursuant to article 94(3) EPC issued for European Application No. 18157473.2 dated Apr. 25, 2019.

Communication pursuant to article 94(3) EPC issued for European Application No. 18157473.2 dated Oct. 1, 2019.

\* cited by examiner

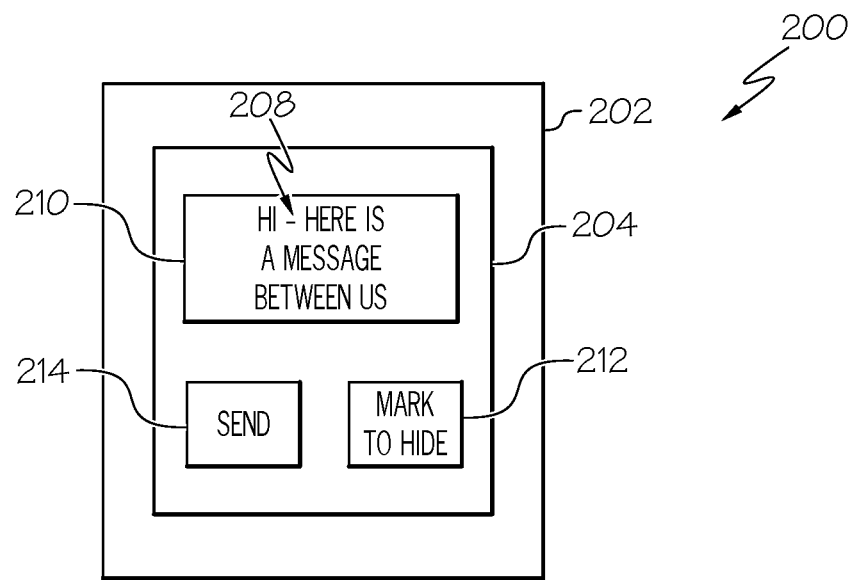
FIG. 2
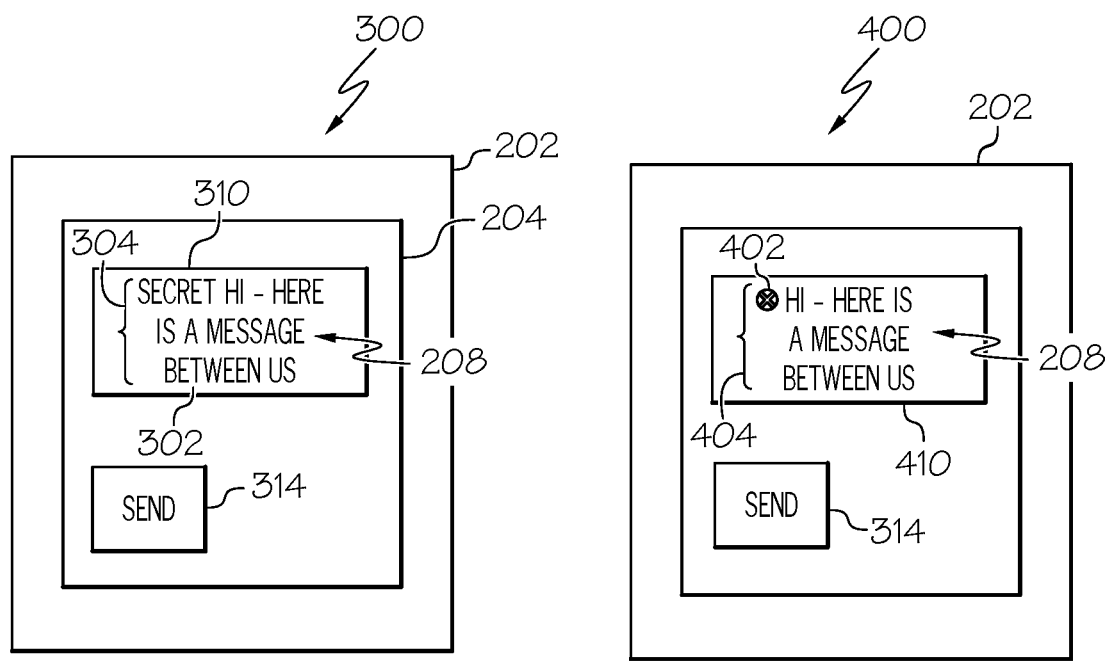
FIG. 3
FIG. 4

DATA MESSAGING WITH PRIVACY TOKENS

FIELD OF THE DISCLOSURE

The present disclosure generally relates to communicating data messages between devices, and more particularly to sending messages indicating viewing protection by a receiver.

BACKGROUND

Electronic devices are often able to present various types of presentable content to a user. For example, presentation data is able to encode various types of presentable content, such as visual images, videos, other presentations that are audible, visual, sensible in other ways, or combinations of these, that an electronic device is able to present to a user, such on a visual display. Examples of another type of presentation data include audible presentations where the presentation data encodes sounds that can be reproduced by an electronic device. The contents of some presentations encoded by presentation data can be sensitive and it is sometimes desired to limit the mode of presenting such presentations so as to reduce the likelihood that the presentation can be unintentionally viewed, heard, or be otherwise provided to unintended persons. Such presentation data is able to be sent to others via various data messaging formats and the sender in some instances may wish to specify that presentations of the presentation data is protected from being provided to unintended persons.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 illustrates a first message composer user interface, according to an example;

FIG. 3 illustrates a second message composer user interface, according to an example;

FIG. 4 illustrates a third message composer user interface, according to an example;

DETAILED DESCRIPTION

Figure 1:
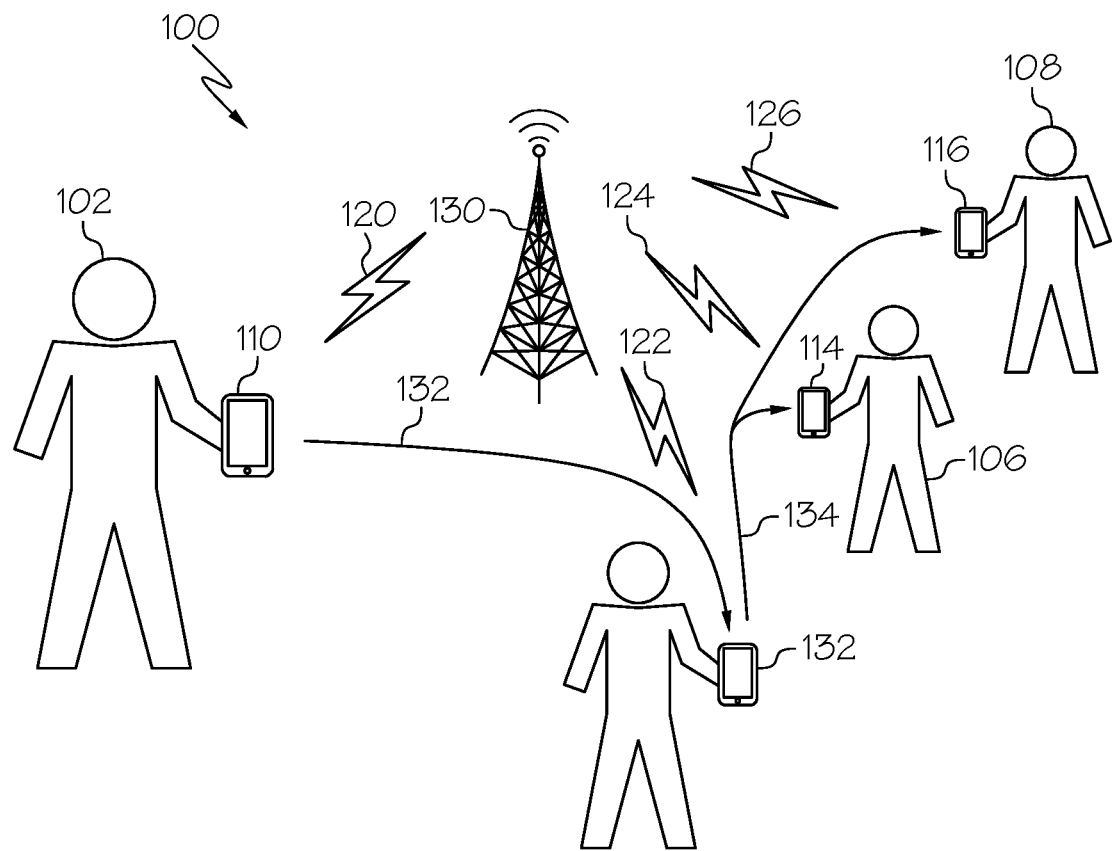
FIG. 1 illustrates a messaging environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate with data messaging systems to allow a sender of presentable content to specify that presentations of that presentable content is to be protected from being perceived by unintended persons. In various examples, presentation data is able to include any type of data that is able to be perceived by a user of a device, such as text messages, images, audio, other perceivable data, or combinations of these. The below descriptions present examples that are based on systems and methods that exchange text messages as presentable content defined by presentation data that is communicated via any type of text messaging system.

In an example, a sender is able to compose a text message. As part of composing the text message, the sender is able to include a privacy indication token within the text message prior to sending the text message to a recipient. In some examples, the privacy indication token is a particular user input pattern, such as a particular word, code such as an indication of an emoji, another code, other data, or combinations of these. In an example, the privacy indication token is contained within the body of the text message. In some examples, the privacy indication token is able to be included as part of the normal operation of composing a message with a conventional message composition application or function. For example, the below described systems and methods are able to be used by an unmodified conventional text messaging application by allowing the sender to insert keywords, particular emoji, other codes, or combinations of these, into the text message by using the conventional user input keyboard or other facilities. Inserting one or more of these items in some examples indicates that the message is to be presented with a presentation privacy filter at the receiving device.

In some examples, a text message or other message is able to be composed with a program, application, function, or other facility that recognizes when a privacy indication token has been inserted into the message by a user composing the message. In some such examples, the program, application, function, or other facility recognizes that a privacy indication token has been entered and a presentation privacy filter is automatically applied to the display of the message being composed.

Particular privacy indication tokens in an example are able to be defined according to any technique. In some examples, privacy indications tokens are able to be specified by a defined list programmed into devices exchanging such message, by configuration of specific patterns provided by a user of a device or other person, by any other technique, or by combinations of these.

Continuing with the example of sending a text message that includes a privacy indication token, a suitable receiver of a text message operates to determine if a received text message includes a privacy indication token. For example, the text message may contain a particular word or emoji code that the receiver is configured to recognize as a privacy indication token. Upon detecting such a privacy indication token, the receiver in an example applies a presentation privacy filter before ever displaying the text message. In various examples, any suitable presentation privacy filter is able to be used.

A presentation privacy filter that is used in the below described systems and methods is able to be any type of processing that is applied to content that obscures or renders a presentation of that content unintelligible to an observer. In an example, a presentation privacy filter obscures the entire image being presented on the display and allows a user to provide inputs to expose a portion of the content without being obscured. In such an example the presentation privacy filter receives an input, such as an object touching a point on a touch sensitive display, and based on receiving that input a small area of the obscured display is presented in an unobscured, clear form to allow the user to clearly view a portion of the displayed content. In another example, a presentation privacy filter operates by obscuring most of the image being presented on the display but leaves a relatively small portion of that image unobscured and in clear form even without any input by a user. In another example, a presentation privacy filter obscures the entire image being presented on the display and allows a user to provide inputs to expose a portion of the content without being obscured, as described above. However, in this example, the relatively small portion of that image unobscured and in clear form remains unobscured and in clear form after removal of the input, such as removal of an object touching the display. In some examples, the above variations are able to be selected based upon any criteria, such as device configurations, enterprise policies, other criteria, or combinations of these.

In these examples, an input is then able to be received to move the small area presenting an unobscured, clear form of the image. For example, movement of a point of contact of an object, such as a user's finger, on the screen is able to operate to expose other portions of the display. In an example, moving the contact point causes the previously exposed content near the earlier contact point to be obscured. By moving the contact point over a large portion of the touch sensitive display, a user can gradually view the entire displayed content.

In an example, a privacy display mode for displaying content is an example of a presentation privacy filter. A privacy display mode in an example allows users view private information in public places by obscuring portions of the screen that are not being actively viewed/used.

In an example, a privacy display mode is able to be implemented by creating two presentation image layers. A first presentation image layer contains the contents to be presented, and a second presentation layer is an obscured version of the content to be presented. In an example, an initial presentation of content includes a presentation with the second presentation layer presented "over" the first presentation layer so as to obscure the first presentation layer. In an example, when a user presses their finger on the screen, a mask or 'hole' is cut out of the second presentation layer, allowing the user to see through the blurring and obscuring. When the user lifts the finger from the screen, the content is then obscured again.

In one example, a privacy display mode is able to obscure selected portions of the display by darkening those selected portions. In an example an Organic Light Emitting Diode (OLED) display is able to not illuminate, e.g., "turn off," portions of the display that are to be obscured while only illuminating the unobscured portions of the display that are to be exposed on the display.

In some examples, various modes are able to be used to expose unobscured content when the user selects an area of the display, such as by touching the display at a location. In one example, a "word mode" or "circle mode" exposes an exposed portion of the content as a circular area or other area of unobscured content in an area near the user's touching of the display. In another example, a "line mode" exposes an exposed portion of the content as a horizontal line of a suitable height, such as a height corresponding to one line of text. A "partial mode" always leaves a portion of the display exposed while the remainder of the display is obscured. A "smear mode" exposes a first portion of an exposed portion and gradually obscures a remaining portion of the exposed portion outside of the first portion. The first portion in an example is selected by an input from a user, such as a touching of the screen, on the display and leaves it exposed for an interval of time. The "smear mode" allows portions of the display to be exposed by moving the selected location and thus exposing the content along the path where the user's finger touched within that time interval. A "typing mode" exposes a circle or other area around an insertion point in the content where the user is typing data. In an example, the exposed area in "typing mode" is obscured after a user types a particular character, such as a "space" character.

One mode referred to as "input mode" is an example of "partial mode" that obscures all of the display except for a line that corresponds to an area of the display that presents text or other data that a user is presently inputting. In an example of "input mode," an instant messaging application is able to operate by exposing only the last 'part' of the conversation, which is generally the portion that is of greater interest to the user (the size of the exposed portion could change with the height of newly received height). In one example of "input mode," the rest of the conversation stays obscured unless explicitly revealed by touching the screen. In further examples of "input mode," another mode, such as the above described "word mode," "line mode," "smear mode," other modes," or combinations of these, are able to be used for the remainder of the display outside of the "input" line that is exposed in "input mode." In an example, a particular mode, such as "word mode," "line mode," "smear mode," other modes," "input mode," or combinations of these, are able to be selected by a user via any suitable technique. In some examples, once a particular mode is selected, that last choice is stored and used the next time information is to be presented with a privacy display mode. In some examples, different selections are able to be individually stored and used for different applications, activities, display screens within applications, other conditions, or combinations of these.

In various examples, the amount of blurring, obscuring, darkening, other hiding effects, or combinations of these, are able to be configurable. In an example, less blurring or other obscuring allows the content to faintly make out where content is present on the screen in order to determine where to touch the screen. In an example, the opacity around text and images could be 100% so the user would only see "blocks" of obscured content.

In various examples, the receiver is able to be configured to respond in various ways to messages that include privacy indication tokens. In some examples, the receiver always applies the presentation privacy filter when presenting the presentable data, such as a text message, and does not allow the user to disable the presentation privacy filter. In further examples, the receiver is able to be configured to prompt the user as to whether a presentation privacy filter is to be applied or if the content is to be presented clearly. In another example, the receiver is able to be configured to apply the presentation privacy filter when first presenting the content and then allow the user to disable to presentation privacy filter.

In some examples, a value of a privacy indication token included in a message may indicate restrictions on how a device is able to display presentable data in that message. For example, a privacy indication token is able to indicate a minimum level of obfuscation to be applied when presenting the presentable data. In an example, one or more privacy indication tokens are able to indicate a maximum transparency value of a presentation privacy filter. In a particular example, a receiver is able to be configured to respond to a message that includes a particular privacy indication token value by interpreting the particular privacy indication token to specify that a maximum transparency value of 5% (which corresponds to minimum of 95% obfuscation) is to be applied when presenting the presentable data in the message. In such examples, a sender is able to enforce a minimum level of privacy with presentations of presentable data.

In general, the systems and methods described below are applicable to any type of device. In various examples, these systems and methods are applicable to any type of electronic device that is able to be used in any type of operational environment. In some examples, these systems and methods are able to be included in desktop systems, physically installed systems, other systems that are not intended to be frequently moved, or in combinations of these. In further examples, these systems and methods can be incorporated into one or more of portable electronic devices, which include devices that are easily carried by a person or other carrier; or mobile devices including smartphones, tablets, phablets, wearable devices, and include devices mounted in movable systems such as vehicles of any type. In various examples, these electronic devices are able to be located in vehicles that include, but are not limited to, motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising. These electronic devices are also able to include fixed devices, which include devices that are not designed to be easily or often relocated such as desktop electronic equipment; other types of electronic equipment, or combinations of these. Other examples of devices include an endpoint device, IoT (Internet of Things) device, EoT (Enterprise of Things) device, etc.

FIG. 1 illustrates a messaging environment 100, according to an example. The messaging environment 100 depicts a number of communications device users who are exchanging messages via wireless data communications. The messaging environment 100 includes a wireless network 130 that allows various wireless communications devices to communicate with one another. Although the messaging environment 100 depicts the wireless network 130 as a single tower, it is clear that various wireless networks are able to include any number of communications towers, transceivers, other equipment, various wireless communications technologies, or combinations of these. In further examples, communications devices are able to communicate over wired communications, combinations of wired and wireless communications, any suitable communications network, or combinations of these.

The messaging environment 100 includes a first user 102 with a first communications device 110 and a second user 104 with a second communications device 112. The first communications device 110 has wireless communications with the wireless network 130 via a first wireless link 120 and the second communications device 112 has wireless communications with the wireless network 130 via a second wireless link 122. In the illustrated example, the first user 102 is using the first communications device 110 to send a message 132 to the second communications device 112 via the wireless network 130. The message 132 in this example is a text message such as may be communicated via a Short Messaging Service (SMS) protocol, via any other text messaging protocol, via any type of application, or via combinations of these. In general, the message 132 is able to be any type of message communicated between or among electronic communications devices.

In an example, the message 132 conveys presentable content which is a text message directed to the second user 104. The message 132 in this example includes presentable data that includes data defining that text message content that is intended to be presented to the second user 104. In the example of a text message, the text of the message is the presentable content. In one such example, the presentable data that defines the presentable content within the message 132 does not include the data contained within the message 132 that is used to support communications. In some examples, presentable data does not include one or more of message addressing data, data communications channel support information such as status flags or other communications protocol supporting data, data other than content to be presented to the user of the receiving communications device, or combinations of these.

As is described in further detail below, the first user 102 is able to insert a privacy indication token into the message 132 prior to sending that message 132. The privacy indication token in the message 132 in an example causes the second communications device 112 to apply a presentation privacy filter when displaying the presentable data contained within the message 132. Such a presentation privacy filter in an example obscures or obfuscates the presentable content so that it is not normally intelligible by a viewer. In an example, the presentation privacy filter allows a user to select a portion of the content to be clearly presented. In the example of a text message, the presentation privacy filter may blur, cloud, blank or otherwise obscure, the text so that it cannot be read. The user interface may allow a user to select a portion of the display that will be clearly presented, such as a "spotlight" within the darkened or blurred presented image.

The messaging environment 100 depicts a third user 106 with a third communications device 114 and a fourth user 108 with a fourth communications device 116. The third communications device 114 in this example has wireless communications with the wireless network 130 via a third wireless link 124 and the fourth communications device 116 has wireless communications with the wireless network 130 via a fourth wireless link 126. In the illustrated example, the second user 104 receives the message 132 on the second communications device 112 and decides to forward that message, as a forwarded message 134, to the third communications device 114 and the fourth communications device 116. In an example, the second communications device 112 is configured to ensure that the privacy indication token that the sender, i.e., the first user 102 in this example, inserted into the presentable data is retained within the presentable data of the forwarded message 134. In further examples, the second communications device may be configured to allow removal of the privacy indication token under certain conditions, such as after prompting for and receiving a confirmation by the user of his or her intention to remove the privacy indication token. In some examples, the privacy indication token inserted by the original sender, e.g., the first user 102, into the presentable data may indicate to a receiving device whether the privacy indication token may be removed by the receiver, or if its removal is prohibited.

FIG. 2 illustrates a first message composer user interface 200, according to an example. The first message composer user interface 200 is an example of a user interface provided to a user of a text messaging application in order to create a message that contains a privacy indication token. The first message composer user interface 200 depicts a communications device 202 with a display 204. The communications device 202 is an example of the first communications device 110 discussed above.

User inputs provided to control operations of communications device 202 in various examples are able to be provided by any suitable technique. In some examples, display 204 is able to be a touch sensitive screen that allows a user to enter data by contacting a particular portion of the display 204. In further examples, user input is able to be provided by any suitable technique, such as by user input devices to manipulate user interface elements presented on display 204.

The illustrated display 204 includes a first text composition window 210 into which a user is able to enter text to be sent to another device. In this example, the user has entered a text message 208 that includes "HI—HERE IS A MESSAGE BETWEEN US." In this example, this text is presentable content that is encoded into presentable data contained in a message sent by the communications device 202.

The display 204 illustrated in this example is a touch sensitive display that allows a user to select options by touching a graphical display element, such as a labeled button. The illustrated display 204 includes a SEND button 214 and a MARK TO HIDE button 212. The communications device 202 sends the contents in the first text composition window 210 when the user selects, such as by touching, the SEND button 214.

Prior to sending the message, a user in this example is able to cause the text messaging application to insert a privacy indication token into the text message. The user in this example is able to select, such as by pressing the graphical user interface element, the MARK TO HIDE button 212. When this button is selected in an example, a suitable privacy indication token is inserted into the textual data of the message. In various examples, the privacy indication token is able to be any code or data, printable or non-printable, that can be encoded into the presentable data to be sent by the message sent by the communications device 202. In some examples, insertion of the privacy indication token into the message, such as based on pressing the MARK TO HIDE button 212, causes a presentation privacy filter to be applied to the presentation of content in the first text composition window 210. An example, of such a presentation privacy filter is described in further detail below.

In an example, the MARK TO HIDE button 212 is able to toggle between inserting privacy indication token and removing the privacy indication token once the privacy indication has been inserted. For example, the first text composition window 210 may not initially contain a privacy indication token. Once a privacy indication token is inserted into the textual data of the message, either by a selection of the MARK TO HIDE button 212, direct entry by a user, by other means, or combinations of these, the MARK TO HIDE button 212 is able to be configured to remove the privacy indication token. In some examples, after a privacy indication token has been inserted the label of the MARK TO HIDE button 212 may change to, for example, MARK TO UNHIDE. Removal of the privacy indication token, such as by selecting a MARK TO UNHIDE button, by other techniques, or combinations of these, in some examples causes the MARK TO HIDE button 212 to resume it function to insert a privacy indication token as is described above.

In some examples, a privacy indication token is able to be inserted in response to any operation of other inputs or controls or the communications device 202. In an example, a privacy indication token is inserted into a message being composed when an input is received to enable a presentation privacy filter on the communications device 202. For example, as a user is composing any type of message, the user is able to cause a presentation privacy filter to be applied to the display 204. The processing within the communications device 202 in an example determines that an input to apply a presentation privacy filter to the display 204 presenting the message being composed, and inserts a privacy indication token into the message. In some such examples, processing monitors for an input to disable the presentation privacy filter and removes the privacy indication token if such an input is detected before sending that message. In further such examples, an inserted privacy indication token is not removed upon detection of an input to disable the presentation privacy filter on the display 204.

FIG. 3 illustrates a second message composer user interface 300, according to an example. The second message composer user interface 300 is similar to the above described first message composer user interface 200 but does not include the MARK TO HIDE button 212. The second message composer user interface 300 is similar in some cases to a conventional text messaging user interface. In an example, a user is able to use a conventional text messaging application to compose and send a text message that includes a privacy indication token to a suitable destination communications device.

The display 204 includes a second text composition window 310 into which the user is able to enter text to be sent to another device. The second text composition window 310 is similar to the first text composition window 210 in that a user is able to enter a text message by using various user input devices. The user in this example has entered a second text message 304 into the second text composition window 310 which includes the above described text message 208 "HI—HERE IS A MESSAGE BETWEEN US" and also includes a special text keyword 302. The special text keyword 302 in this example is the word SECRET, in capital letters. In an example, the user is able to simply type the word SECRET directly into the second text composition window 310 in order to insert a privacy indication token into the text of the message to be sent.

In the illustrated example of the second message composer user interface 300, the special text keyword 302 SECRET is a privacy indication token. In an example, communications devices to which the communications device 202 sends messages are configured to determine that the text content of the message includes the special text keyword 302 SECRET. Such communications devices, in an example, are further configured to apply a presentation privacy filter when displaying text messages that include a special text keyword. In this example, a user of the second message composer user interface 300 is able to send messages that will automatically be displayed with a presentation privacy filter when they are received by a suitably configured communications device. In some examples, insertion of the privacy indication token into the message, such as the special text keyword 302 SECRET, causes a presentation privacy filter to be applied to the presentation of content in the second text composition window 310. An example, of such a presentation privacy filter is described in further detail below.

The above examples depict the operations of a user interface to allow composition of a message that includes a privacy indication token. In further examples of any of the above described user interfaces, or in examples of any user interface to compose or otherwise create, to modify or to otherwise edit, or to perform any combinations of these, a composition window is able to have a presentation privacy filter applied when a message is to be protected. In an example, a device is able to be configured to recognize when a privacy indication token is entered by any suitable technique into a message, including those described above, and respond by automatically applying a presentation privacy filter to the display of the message being composed, created, edited, modified, or otherwise presented on the composing device. In an example, applying the presentation privacy filter is performed without explicit user action beyond causing the privacy indication token to be inserted into the message.

FIG. 4 illustrates a third message composer user interface 400, according to an example. The third message composer user interface 400 is similar to the above described second message composer user interface 300 and includes the same user interface components. The third message composer user interface 400, however, contains third text message 404 into the third text composition window 410, which includes the above described text message 208 "HI—HERE IS A MESSAGE BETWEEN US" but includes a special emoji token 402. The special emoji token 402 in this example is a stylized "X" or cross, which reflects that presentation of the text message 208 is to be restricted by receiving devices by a presentation privacy filter. In an example, user interface of the communications device 202 allows entry of the special emoji token 402 by any suitable technique. In various examples, the user interface may have a selection of emoji characters that include the special emoji token 402, the user is able to enter a character sequence that will indicate that the special emoji token 402 is to be inserted into the text message, by any other technique, or combinations of these.

In some examples, a standard emoji character, such as are specified by various Unicode standards as defined by the Unicode Consortium.

As with the above described special text keyword 302 SECRET, the special emoji token 402 is an example of a privacy indication token. In an example, communications devices to which the communications device 202 sends messages are configured to determine that the text content of the message includes the special emoji token 402 and will apply a presentation privacy filter when displaying text messages that include such a special emoji token 402. In this example, a user of the third message composer user interface 400 is also able to send messages that will automatically be displayed with a presentation privacy filter when they are received by a suitably configured communications device. In some examples, insertion of the privacy indication token into the message, such as entering the special emoji token 402, causes a presentation privacy filter to be applied to the presentation of content in the third text composition window 410. An example, of such a presentation privacy filter is described in further detail below.

Figure 5:
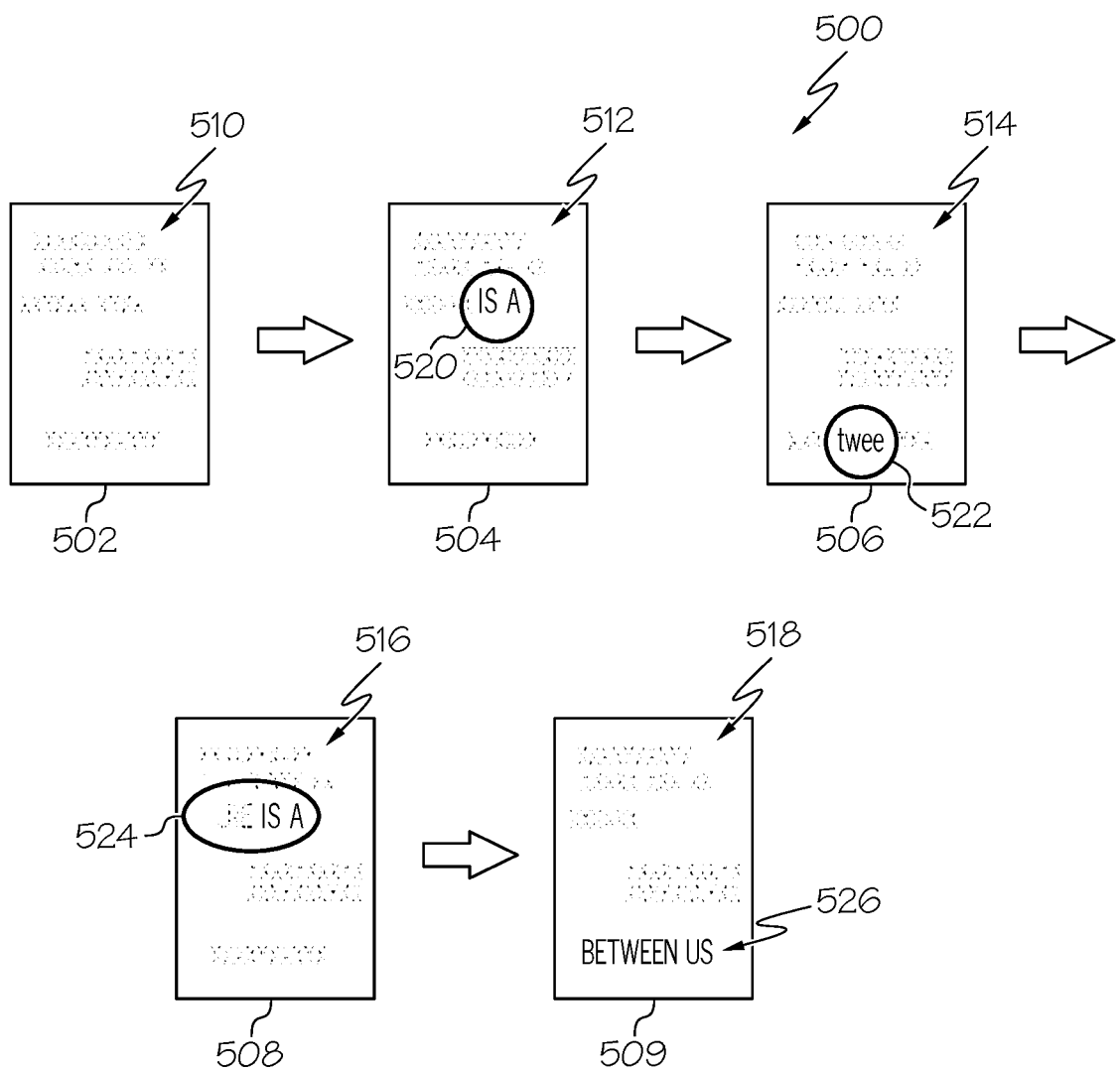
FIG. 5 illustrates a presentation privacy filter operation, according to an example.

FIG. 5 illustrates a presentation privacy filter operation 500, according to an example. The presentation privacy filter operation 500 depicts five example states of a presentation of a received text message that is obscured by a presentation privacy filter. The text of the text message is an example of presentable content that is encoded into the data of a message received by a device. In the illustrated example, the below described presentations are presented based on a received message with presentable data that includes the text message 208 discussed above and also either the special text keyword 302 or the special emoji token 402. In an example, the receiver detected the presence of one or more privacy indication tokens, such as the special text keyword 302 or the special emoji token 402, and applied the below described presentation privacy filter. The presentation privacy filter operations 500 depicts various techniques for clearly presenting exposed portions of content that is otherwise obscured by a presentation privacy filter.

A first presentation privacy filter state 502 depicts a completely obscured presentation 510. In various examples, a presentation privacy filter is able to obscure visual presentable content by, for example, blurring or presenting an unfocused image, presenting an image to which random or pseudo-random visual "noise" is added, by presenting an image that darkens or "blanks" portions that are to be obscured, by any other technique, or by combinations of these.

A second presentation privacy filter state 504 depicts a first partially exposed presentable content 512. The first partially exposed presentable content 512 is similar to the completely obscured presentation 510 except that a first exposed portion 520 of the presentable content is presented in clear form while the remainder of the presentation remains obscured. In the illustrated example, the presentation privacy filter is operating in a circle mode whereby a circular region is presented in clear form. In further examples, a presentation privacy filter is able to operate in a line mode whereby an exposed portion that consists of a line is displayed. In various examples the height and width of the line is able to be based on any suitable criteria, such as a line that is an entire length of the presentation, any other width, or combinations of these.

In various examples, a user is able to specify the location of the first exposed portion 520 by any suitable technique. In an example, a user is able to touch a touch sensitive screen presenting the totally obscured presentation 510 at a location and the first exposed portion 520 is presented at or near the location of that touch. In another example, other user interface facilities, such as a trackball, trackpad, arrow buttons, other user interface devices, or combinations of these, are able to be used to specify, move, or specify and move, a location of the first exposed portion 520. In such a manner, a user is able to expose different portions of the entire message that is obscured in the completely obscured presentation. By exposing different portions of the display, a user is eventually able to view the entirety of the display one portion at a time. The illustrated first exposed portion 520 is shown as a circle. In further examples, other modes, such as the above described "line mode" or "smear mode" is alternatively able to be used to present the first exposed portion.

A third presentation privacy filter state 506 depicts a second partially exposed presentable content 514. The second partially exposed presentable content 514 is similar to the first partially exposed presentable content 512 except that a second exposed portion 522 of the presentable content is presented at a different location than the first exposed portion 520. The second exposed portion 522 depicts an example of a movement of the first exposed portion by, for example, a user dragging his or her finger from a location at or close to the first exposed portion 520 to a location at or close to the second exposed portion 522. In some examples that use other modes, such as "line mode" or "smear mode," the second exposed portion 522 also uses that selected mode to present the exposed portion. The depicted second exposed portion 522 is also a circle, as is depicted for the first exposed portion 522 discussed above.

A fourth presentation privacy filter state 508 depicts a third partially exposed presentable content 516. The third partially exposed presentable content 516 includes a third exposed portion 524 that operates in "smear mode." As discussed above, smear mode exposes unobscured content in areas selected by the user, such as being touched, of the display and leaves them exposed for an interval of time. The "smear mode" allows portions of the display to be exposed by moving the selected location and thus exposing the content along the path where the user's finger touched within that time interval. The third exposed portion 524 shows the same clearly text, "IS A," as is presented in the second exposed portion 522. The third exposed portion 524 also presents some text to the left of the "IS A" that is gradually being re-obscured. The text within the third exposed portion 524 is "HERE IS A" with the "HE" being obscured more than the "RE."

A fifth presentation privacy filter state 509 depicts a fourth partially exposed presentable content 518. The fourth partially exposed presentable content 519 includes a fourth exposed portion 526 that operates in "line mode" or "input mode." As described above, "input mode" operates by obscuring all of the display except for a line that corresponds to an area of the display that presents text or other data that a user is presently inputting. The depicted fourth exposed portion is an example of such an area of the display that has the most recently altered information. In this example of an instant messaging application, the last 'part' of the conversation is exposed, which is the last line of the presently viewed message.

Figure 6:
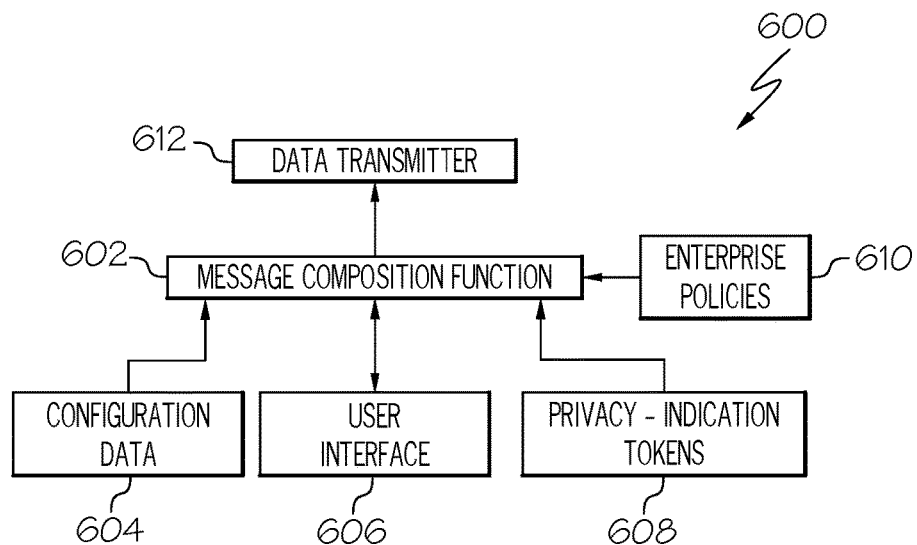
FIG. 6 illustrates a message creation block diagram, according to an example.

FIG. 6 illustrates a message creation block diagram 600, according to an example. The message creation block diagram 600 depicts a message composition function 602 and various sources of data provided to that function. The message composition function 602 is an example of a function that presents and maintains the first message composer user interface 200, second message composer user interface 300, and third message composer user interface 400 described above. The message composition function 602 creates message datasets and sends them to a data transmitter 612 for transmission to destination devices.

The operation of the message composition function 602 in an example is based on data received from a configuration data store 604. The configuration data store 604 in an example includes specifications of rules to be applied to messages that are composed by the message composition function 602. For example, the configuration data store 604 may specify that messages sent to certain addresses are to always include a privacy indication token. In examples where the message composition function 602 operates to forward messages that were received from other sources, the configuration data store 604 is able to specify that privacy indication tokens contained in received messages are not able to be removed when forwarding the message. In some examples, the configuration data store 604 is able to specify that a subset of defined privacy indication token values are not able to be removed when forwarding the messages but other privacy indication token values are able to be removed.

The message composition function 602 receives user input and provides presentations to a user via a user interface 606. Examples of user interface 606 include one or more of keyboards, trackpads, trackballs, touch screen displays, keyboards presented on touch screen displays, other user interfaces, or combinations of these. In an example, the user interface 606 is able to present a table of emojis that includes one or more special emoji tokens as are described above.

In an example, the message composition function 602 operates to receive input data via a user input of the user interface 606. In some examples, the input data is used to compose a message that includes presentable data defining presentable content where the input data includes or specifies the presentable content. The user interface 606 in an example includes a display that the message composition function 602 controls to present a presentation of the presentable content based on receiving the input data. The message composition function 602 determines a presence of a privacy indication token within the input data and applies, based on determining the presence of the privacy indication token within the input data, a presentation privacy filter to the presentation of the presentable content on the display of the user interface 606.

The message composition function 602 in an example receives definitions of privacy indication tokens 608. These definitions are used, for example by the first message composer user interface 200, where a privacy indication token is inserted into a text message after selecting the MARK TO HIDE button 212. These definitions are also used in an example when forwarding a message to determine which data is not able to be removed from the forwarded message.

The message composition function 602 is further able in some examples to receive operating parameters from enterprise policies 610. Enterprise policies 610 in an example are defined by Information Technology departments of an enterprise and specify restrictions or other defined operating modes for the message composition function 602. For example, restrictions on forwarding messages that contain a privacy indication token are able to be specified by the enterprise policies. Enterprise policies 610 in an example are contained within an enterprise policy definition set that is maintained by a processor in communications with a processor implementing the message composition function 602.

Figure 7:
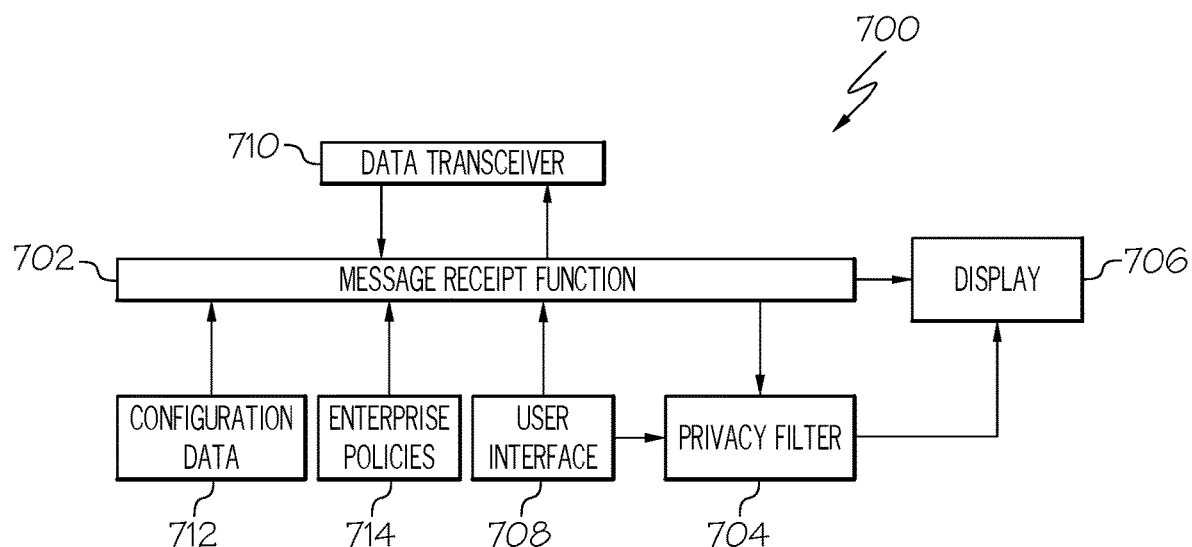
FIG. 7 illustrates a message receiver processing block diagram, according to an example.

FIG. 7 illustrates a message receiver processing block diagram 700, according to an example. The message receiver processing block diagram 700 depicts components within a data receiver. The message receiver processing block diagram 700 depicts a message receipt function 702 and various sources of data received by that function as well as functions that receive data from the message receipt function 702.

The message receipt function 702 is an example of a message receipt processor. The message receipt function 702 in an example receives messages from a data transceiver 710. In an example, the data transceiver 710 receives data messages that were composed by and sent from the components of the above described message creation block diagram 600. The operation of the message receipt function 702 in an example is based on specifications contained within configuration data 712 and enterprise policies 714. In an example, one or both of the configuration data 712 or enterprise policies 714 contain specifications of privacy indication tokens. Enterprise policies 714 in an example are contained within a enterprise policy definition set that is maintained by a processor in communications with a processor implementing the message receipt function 702. In an example, enterprise policies definition sets include specifications of limitations on an ability to remove privacy indication tokens from presentable data within messages.

The message receipt function 702 processes received messages to determine if the message contains one or more privacy indication tokens. As described below, the message receipt function 702 restricts certain aspects of processing messages that include one or more privacy indication tokens. If the message does contain a privacy invitation token, the message receipt function 702 passes the message data to a presentation privacy filter 704. The presentation privacy filter 704 processes the presentation data to obscure a presentation on a display 706 of the content defined by that presentation data in a manner such as is described above with regards to the presentation privacy filter operation 500. If the presentation data contained in the message is determined to not contain a privacy indication token, the data within the message is able to be presented directly and in full on the display 706.

In some examples, the configuration data 712, enterprise policies 714, or both, are able to specify that a user of the device on which the message receipt function 702 is operating is able to override the presentation restrictions normally associated with a privacy indication token. In one such example, a user is able to select, such as via a user interface facility, that a user may disable the application of a presentation privacy filter even though the message includes a privacy indication token. In various examples, such disabling may be restricted to after the message is initially displayed with a presentation privacy filter, or such disabling is able to be the used to initially present a message without a presentation privacy filter.

User interface 708 is able to be used to control various operations of the message receipt function 702. For example, a user may indicate a command to forward a received message to other recipients via inputs to the user interface 708. The user interface 708 is also able to be used to control operation of the presentation privacy filter, such as by specifying a location of, and movement of, the above described first exposed portion 520 on the display.

Figure 8:
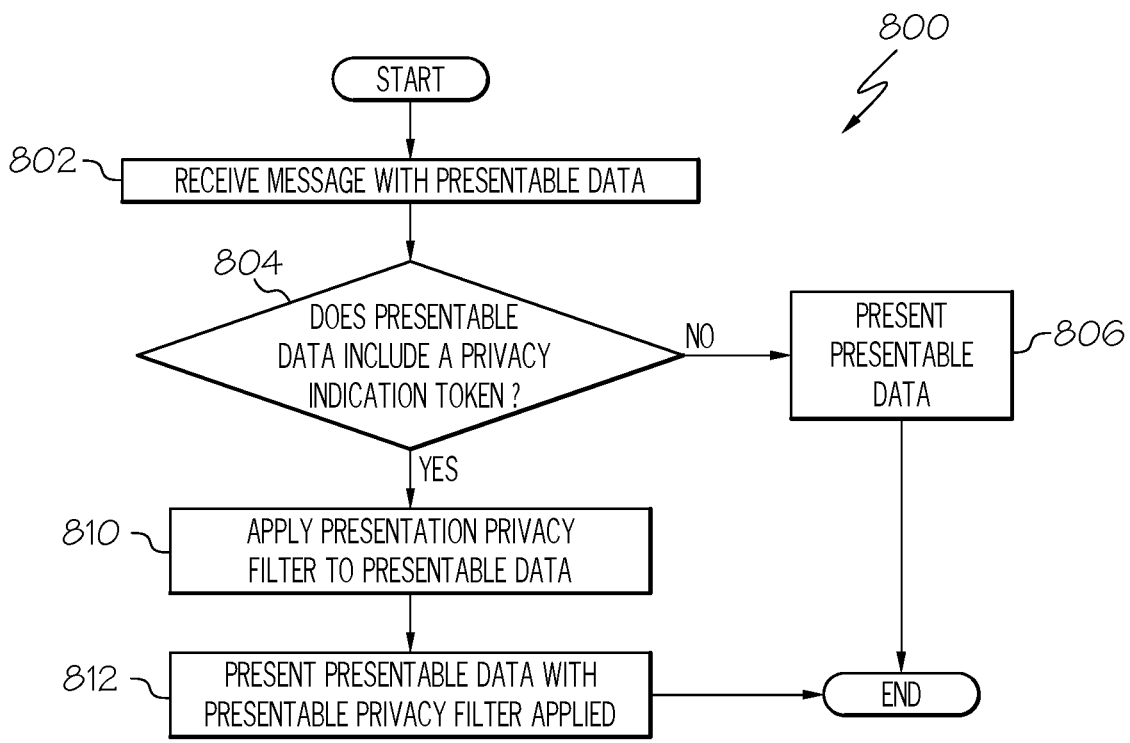
FIG. 8 illustrates a message reception process, according to an example.

FIG. 8 illustrates a message reception process 800, according to an example. The message reception process 800 is an example of a process performed by the above described message receipt function 702.

The message reception process 800 receives, at 802, a message with presentable data that defines presentable content. A text message is an example of a message with presentable data that defines the presentable content, which is the text of the text message. Further examples of messages with presentable data include one or more of messages that include text data, image data, audible data, other data that defines content that can be presented to a user, or combinations of these.

The message reception process 800 determines, at 804, if the presentable data includes a privacy indication token. Examples of a privacy indication token that can be included in presentable data include, but are not limited to, the above described special text keyword 302 and special emoji token 402. If it is determined that a privacy indication token is not included in the presentable data, the presentable content defined by the presentable data data is presented, at 806, and the message reception process 800 end.

Returning the determining if the presentable data includes a privacy indication token, if such determination is true the message reception process 800 applies, at 810, a presentation privacy filter to the presentable data. The presentation privacy filter operation 500 depicts an example of a suitable presentation privacy filter.

The message reception process 800 presents, at 812, the presentable content defined by the presentation data with the presentation privacy filter applied. In an example, this presentation includes allowing a user to select one or more exposed areas of the presentation in which a portion of the presented presentation content is clearly visible. This presentation further allows a user to move the location of such one or more exposed area to allow the user to clearly view different portions of the presentable content. The message reception process 800 then ends.

Figure 9:
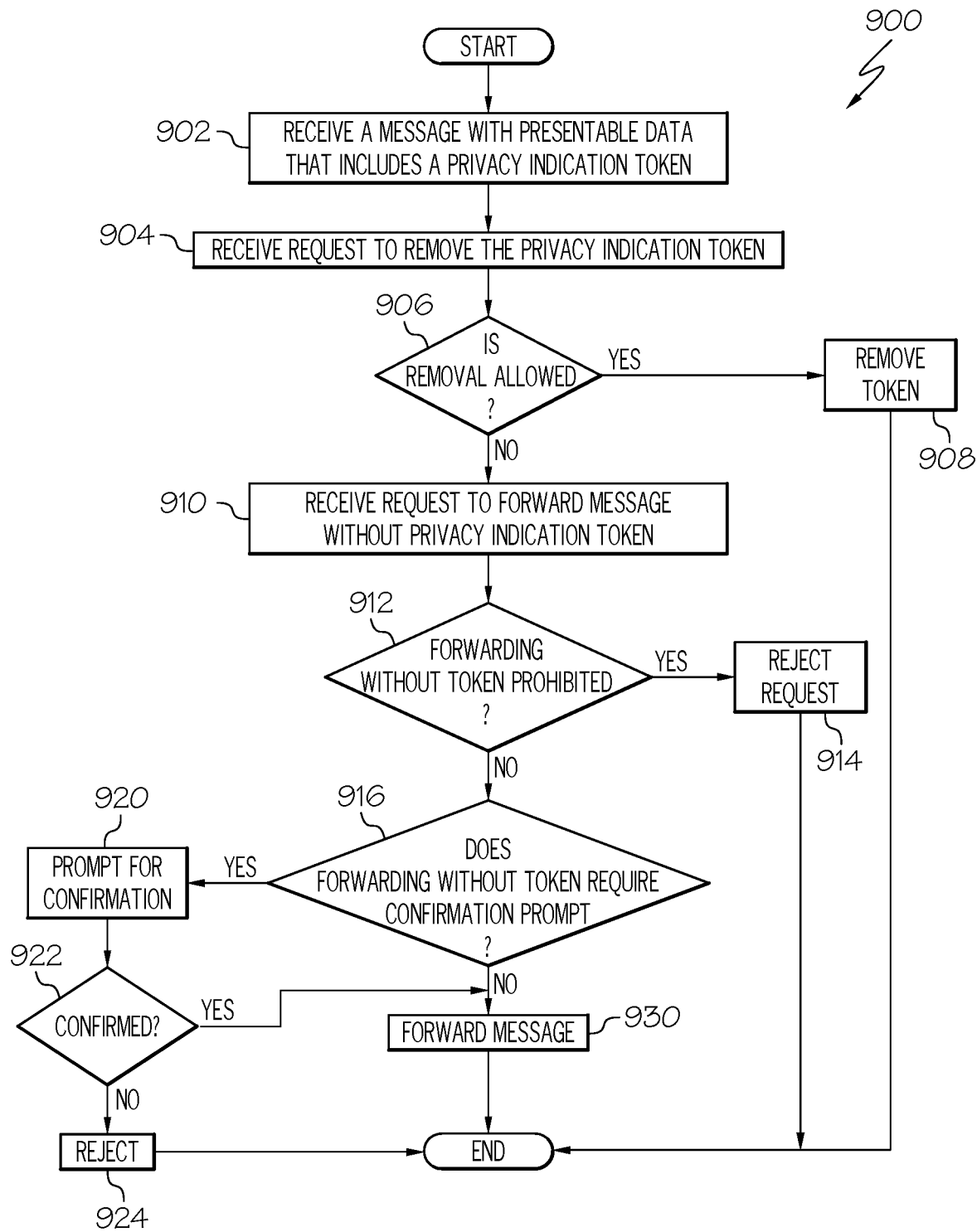
FIG. 9 illustrates a message forwarding process, according to an example.

FIG. 9 illustrates a message forwarding process 900, according to an example. The message forwarding process 900 depicts processing performed upon received messages. In an example, the message forwarding process 900 is performed after the message reception process 800, discussed above, is performed to initially present the presentation content conveyed by the received message.

The message forwarding process 900 receives, at 902, a message with presentable data that includes a privacy indication token. The message forwarding process 900 then receives a request, at 904, to remove the privacy indication token. This request in an example is able to be received from a user via, e.g., the user interface 708 described above. In some examples, the message forwarding process 900, or other components within the message receipt function 702 described above, operate to limit an ability to remove privacy indication tokens from the presentable data.

A determination is made, at 906, as to whether removal of the privacy indication token from a received message is allowed. In some examples, such a determination is based upon configuration data 712, enterprise policies 714, other sources, or combinations of these. In some examples, not allowing the removal of privacy indication tokens includes limiting the ability to remove privacy indication tokens. Such limiting is able to include, for example, at least one of prohibiting removal of the privacy indication token or providing a prompt for confirmation of a request to remove the privacy indication tokens.

In some examples, this determination as to whether removal of the privacy indication token is allowed is also able to be made based upon the value of the privacy indication token, such as in cases where some values are defined to allow removal and other values are defined to prohibit removal. If removal is allowed, the token is removed, at 908. Upon removal of the privacy indication token at this point, the user is able to view a presentation of the presentable content without a presentation privacy filter at any time, forward the message with the privacy indication token, perform other operations upon the message, or combinations of these.

Returning to the determination as to whether removal of the token is allowed, at 906, if this determination is false, the token is not removed and the message forwarding process 900 receives, at 910, a request to forward the message without the privacy indication token. Such a request is able to be received via, for example, the user interface 708 described above.

A determination is made, at 912, as to whether forwarding of the message without the privacy indication token is prohibited. In some examples, such a determination is based upon configuration data 712, enterprise policies 714, other sources, or combinations of these. In some examples, this determination is also able to be made based upon the value of the privacy indication token, such as in cases where some values are defined to allow forwarding without the token other values are defined to require inclusion of the token when the message is forwarded. If this determination true, the request is rejected, at 914 and the message forwarding process 900 ends.

Returning to the determination as to whether forwarding without the token is prohibited, if such determination is true, a determination, at 916, is made as to whether forwarding of the message without the token requires confirmation by the user. Such confirmation is able to limit unintended forwarding of messages that contain a privacy indication token where the forwarded message would have that token removed. In some examples, such a determination is based upon configuration data 712, enterprise policies 714, values of the privacy indication tokens, other sources, or combinations of these. If confirmation is required, a prompt for conformation is made, at 920. A determination of whether confirmation is provided is performed at 922. If confirmation is not provided, the request is rejected, at 924, and the message forwarding process 900 ends.

Returning to determining if forwarding without a token is prohibited, at 916, if such a determination false, or if the determination of confirmation of the request to forward the message is true, at 922, the message is forwarded, at 930. The message forwarding process 900 then ends.

Figure 10:
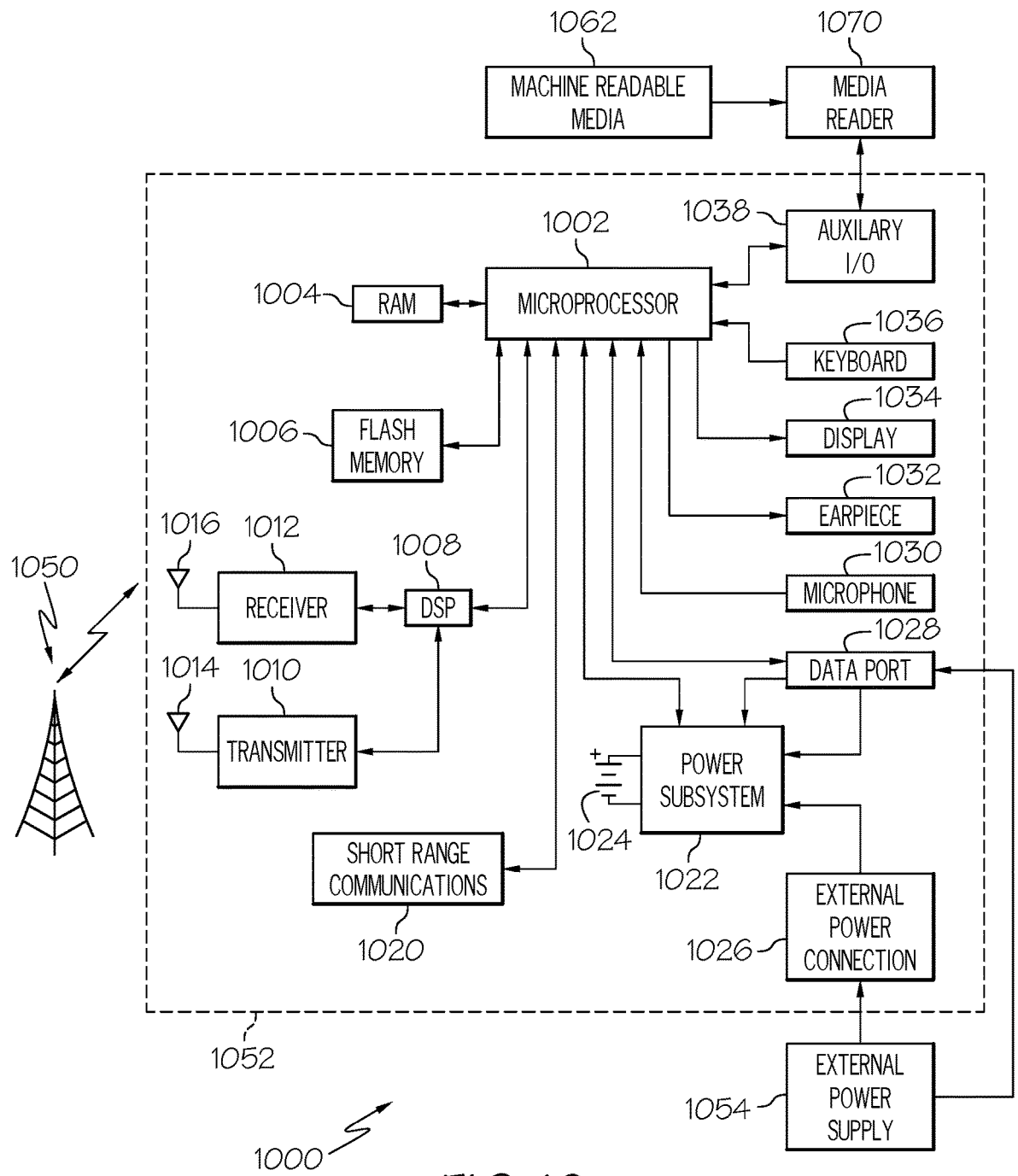
FIG. 10 is a block diagram of an electronic device and associated components in which the systems and methods disclosed herein may be implemented.

FIG. 10 is a block diagram of an electronic device and associated components 1000 in which the systems and methods disclosed herein may be implemented. The electronic device 1052 in this example is a wireless two-way communication device with one or more of the following: voice, text, and data communication capabilities. Such electronic devices communicate with a wireless voice, text, or data network 1050 using a suitable wireless communications protocol. Wireless voice communications may be performed using either an analog or digital wireless communication channel. Data communications allow the electronic device 1052 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 1052 is an example electronic device that includes two-way wireless communications functions. Such electronic devices may incorporate communication system elements such as a wireless transmitter 1010, a wireless receiver 1012, and associated components such as one or more antenna elements 1014 and 1016. A digital signal processor (DSP) 1008 performs processing to extract data from received wireless signals and to generate signals to be transmitted. The particular design of the communication system may be dependent upon the communication network and associated wireless communications protocols with which the device is intended to operate.

The electronic device 1052 includes a microprocessor 1002 that controls the overall operation of the electronic device 1052. The microprocessor 1002 interacts with the above described communications system elements and also interacts with other device systems. In various examples, the electronic device 1052 is able to include one or more of various components such as a flash memory 1006, random access memory (RAM) 1004, auxiliary input/output (I/O) device 1038, data port 1028, display 1034, keyboard 1036, earpiece 1032, audio sound reproduction system 1070, microphone 1030, a short-range communications system 1020, a power system 1022, other systems, or combinations of these.

One or more power storage or supply elements, such as a battery 1024, are connected to a power system 1022 to provide power to the circuits of the electronic device 1052. The power system 1022 includes power distribution circuitry for providing power to the electronic device 1052 and also contains battery charging circuitry to manage recharging the battery 1024 (or circuitry to replenish power to another power storage element). The power system 1022 receives electrical power from external power supply 1054. The power system 1022 is able to be connected to the external power supply 1054 through a dedicated external power connector (not shown) or through power connections within the data port 1028. The power system 1022 includes a battery monitoring circuit that is operable to provide a status of one or more battery status indicators, such as remaining capacity, temperature, voltage, electrical current consumption, and the like, to various components of the electronic device 1052.

The data port 1028 is able to support data communications between the electronic device 1052 and other devices through various modes of data communications, such as high speed data transfers over an optical communications circuits. Data port 1028 is able to support communications with, for example, an external computer or other device. In some examples, the data port 1028 is able to include electrical power connections to provide externally provided electrical power to the electronic device 1052, deliver electrical power from the electronic device 1052 to other externally connected devices, or both. Data port 1028 of, for example, an electronic accessory is able to provide power to an electronic circuit, such as microprocessor 1002, and support exchanging data between the microprocessor 1002 and a remote electronic device that is connected through the data port 1028.

Data communication through data port 1028 enables a user to set preferences through the external device or through a software application and extends the capabilities of the device by enabling information or software exchange through direct connections between the electronic device 1052 and external data sources rather than via a wireless data communication network. In addition to data communication, the data port 1028 provides power to the power system 1022 to charge the battery 1024 or to supply power to the electronic circuits, such as microprocessor 1002, of the electronic device 1052.

Operating system software used by the microprocessor 1002 is stored in flash memory 1006. Examples of flash memory 1006 are able to include, for example, flash memory, magnetic based storage devices, other volatile or non-volatile data store elements, or the like. Some examples are able to use flash memory 1006 that includes a battery backed-up RAM or other non-volatile storage data elements to store operating systems, other executable programs, or both. The operating system software, device application software, or parts thereof, are able to be temporarily loaded into volatile data storage such as RAM 1004. Data received via wireless communication signals or through wired communications are also able to be stored to RAM 1004. The microprocessor 1002 in some examples are able to execute program components, such as is able to be defined in flash memory 1006 in one example, that cause the microprocessor 1002 to perform the above described processes and methods.

The microprocessor 1002, in addition to its operating system functions, is able to execute software applications on the electronic device 1052. A set of applications that control basic device operations, including at least data and voice communication applications, is able to be installed on the electronic device 1052 during manufacture. In an example, programs and other data used to support the processes described above are able to be installed in the memory of the electronic device 1052. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 1052 through, for example, the wireless network 1050, an auxiliary I/O device 1038, Data port 1028, short-range communications system 1020, or any combination of these interfaces. Such applications are then able to be installed by a user in the RAM 1004 or a non-volatile store for execution by the microprocessor 1002.

In a data communication mode, a received signal such as a text message or web page download is processed by the communication system, including wireless receiver 1012 and wireless transmitter 1010, and communicated data is provided the microprocessor 1002, which is able to further process the received data. In some examples, the electronic device 1052 includes a display, output ports, or combinations of these. In such examples, the received data is able to be processed for output to the display 1034, or alternatively, to an auxiliary I/O device 1038 or the Data port 1028. In examples of the electronic device 1052 that include a keyboard 1036 or other similar input facilities, a user of the electronic device 1052 may also compose data items, such as e-mail messages, using the keyboard 1036, which is able to include a complete alphanumeric keyboard or a telephone-type keypad, in conjunction with the display 1034 and possibly an auxiliary I/O device 1038. Such composed items are then able to be transmitted over a communication network through the communication system.

For voice communications, overall operation of the electronic device 1052 is substantially similar, except that received signals are generally provided to an earpiece 1032 and signals for transmission are generally produced by a microphone 1030. Alternative voice or audio I/O systems, such as a voice message recording system, may also be implemented on the electronic device 1052. Although voice or audio signal output is generally accomplished primarily through the earpiece 1032, in examples of electronic devices 1052 that include a display 1034, the display 1034 may also be used to provide an indication of the identity of a calling party, the duration of a voice call, or other voice call related information, for example.

Depending on conditions or statuses of the electronic device 1052, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 1020 provides for data communication between the electronic device 1052 and different systems or devices, which need not necessarily be similar devices. For example, the short-range communications system 1020 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 1060 is able to be connected to an auxiliary I/O device 1038 to allow, for example, loading computer readable program code of a computer program product into the electronic device 1052 for storage into flash memory 1006. One example of a media reader 1060 is an optical drive such as a CD/DVD drive, which may be used to store data to and read data from a computer readable medium or storage product such as computer readable storage media 1062. Examples of suitable computer readable storage media include optical storage media such as a CD or DVD, magnetic media, or any other suitable data storage device. Media reader 1060 is alternatively able to be connected to the electronic device through the Data port 1028 or computer readable program code is alternatively able to be provided to the electronic device 1052 through the wireless network 1050.

In an example, the principles described above are able to be realized as a computer readable storage medium having computer readable program code embodied therewith. The computer readable program code in an example comprising instructions for: receiving a message comprising presentable data defining presentable content; determining a presence of a privacy indication token within the presentable data; and applying, based on determining the presence of the privacy indication token within the presentable data, a presentation privacy filter to presentations of the presentable content.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, comprising:
receiving a message comprising presentable data defining presentable content comprising textual data;
determining a presence of a privacy indication token within the presentable data;
determining an area of unobscured content within the presentable content, wherein the area of unobscured content is determined independently of data in the message;
applying, based on determining the presence of the privacy indication token within the presentable data, a presentation privacy filter to the presentable content;
receiving a request to remove the privacy indication token from the message;
rejecting, based on a determination that removal of the privacy indication token from the message is not allowed, the request to remove the privacy indication token from the message;
receiving a request to forward the message, without the privacy indication token, to another communications device associated with another user;
determining, based on receiving the request to forward the message, that forwarding the message without the privacy indication token requires receiving conformation from a user;
receiving confirmation by the user to remove the privacy indication token; and
forwarding, based on receiving confirmation to remove the privacy indication token, the presentable data with the privacy indication token removed.

2. The method of claim 1, where the privacy indication token comprises an emoji.

3. The method of claim 1, further comprising:
maintaining an enterprise policies definition set, wherein enterprise policies in the enterprise policies definition set specify whether it is allowed to remove privacy indication tokens from messages,
where determining that removing the privacy indication token from the message is not allowed comprises examining the enterprise policies definition set to determine whether it is allowed to remove privacy indication tokens from messages.

4. The method of claim 1, wherein the area of unobscured content comprises a horizontal line that is a width of the presentable content.

5. The method of claim 1, wherein the area of unobscured content comprises a horizontal line that has a width of one word of the textual data.

6. The method of claim 1, further comprising:
receiving an input selecting an area corresponding to the area of unobscured content, and
wherein defining the area of unobscured content is based upon receiving the input.

7. The method of claim 1, further comprising:
receiving a first input indicating a touch on a touch sensitive display at a first location, the area of unobscured content is selected based on the first location,
defining, based on receiving the first input, a first area to be the area of unobscured content, the first area being near but removed from the first location;
receiving a second input indicating a dragging movement of the touch along a path to a second location of the touch sensitive display;
extending, based upon receiving the second input, the area of unobscured content to include presentable content along the path; and
gradually re-obscuring, after a time interval after receiving the second input, presentable content within the first area.

8. The method of claim 1, further comprising:
receiving a first input indicating a touch on a touch sensitive display at a first location, the area of unobscured content is selected based on the first location,
defining, based on receiving the first input, a first area to be the area of unobscured content, the first area being near but removed from the first location;
receiving a second input indicating a dragging movement of the touch along a path to a second location of the touch sensitive display; and
moving, based upon receiving the second input, the area of unobscured content to a second area being near but removed from the second location.

9. The method of claim 1, where:
determining that removing the privacy indication token from the message is not allowed is based on a value of the privacy indication token have a first value; and
determining that forwarding the message without the privacy indication token requires receiving conformation from a user is based on a value of the privacy indication token have a second value that is different than the first value.

10. A data receiver, comprising:
a data receiver configured to receive a message comprising presentable data defining presentable content comprising textual data; and
a message receipt processor configured to:
  determine a presence of a privacy indication token within the presentable data;
  determine an area of unobscured content within the presentable content, wherein the area of unobscured content is determined independently of data in the message;
    apply, based on a determination of the presence of the privacy indication token within the presentable data, a presentation privacy filter to the presentable content;
  receive, from a user interface after presenting the presentable content, a request to remove the privacy indication token from the message;
  reject, based on a determination that removal of the privacy indication token from the message is not allowed, the request to remove the privacy indication token from the message;
  receive a request to forward the message, without the privacy indication token, to another communications device associated with another user;
  determine, based on receipt of the request to forward the message, that forwarding the message without the privacy indication token requires receiving conformation from a user;
  receive confirmation by the user to remove the privacy indication token; and
  forward, based on receipt of confirmation to remove the privacy indication token, the presentable data with the privacy indication token removed.

11. The data receiver of claim 10, the message receipt processor being further configured to restrict an ability of a user to remove the privacy indication token from the presentable data whenever sending the presentable data to another address.

12. The data receiver of claim 10, where the privacy indication token comprises an emoji.

13. The data receiver of claim 10, where the presentable content comprises images.

14. The data receiver of claim 10, further comprising:
limiting an ability to remove the privacy indication token from the presentable data;
receiving a request to forward a message comprising the presentable data; and
forwarding, based on limiting the ability to remove the privacy indication token, the presentable data with the privacy indication token included.

15. The data receiver of claim 14, wherein the limiting comprises providing a prompt for confirmation of a request to remove the privacy indication token.

16. The data receiver of claim 14, further comprising:
maintaining a enterprise policies definition set, wherein enterprise policies in the enterprise policies definition set specify whether it is allowed to remove privacy indication tokens from messages,
where the message receipt processor determines that removing the privacy indication token from the message is not allowed based on examining the enterprise policies definition set to determine whether it is allowed to remove privacy indication tokens from messages.

17. The data receiver of claim 16, wherein the enterprise policies definition set comprises one of a specification to prohibit removal of the privacy indication token or a specification to prompt for confirmation of a request to remove the privacy indication token.

18. A method comprising:
receiving input data via a user input on a device to compose a message, the message comprising presentable data defining presentable content and the input data comprising the presentable content comprising textual data;
determining an input to apply a presentation privacy filter to the presentable content;
inserting, based on determining the input to apply the presentation privacy filter, a privacy indication token into the presentable content;
determining an area of unobscured content within the presentable content, wherein the area of unobscured content is determined independently of data in the message;
applying, based on determining the input to apply a presentation privacy filter to a presentation of the presentable content, a presentation privacy filter to the presentable content;
receiving a request to remove the privacy indication token from the message;
rejecting, based on a determination that removal of the privacy indication token from the message is not allowed, the request to remove the privacy indication token from the message;
receiving a request to forward the message, without the privacy indication token, to another communications device associated with another user;
determining, based on receiving the request to forward the message, that forwarding the message without the privacy indication token requires receiving conformation from a user;
receiving confirmation by the user to remove the privacy indication token; and
forwarding, based on receiving confirmation to remove the privacy indication token, the presentable data with the privacy indication token removed.

19. The method of claim 18, where the presentable content comprises text and where the privacy indication token comprises an emoji.

* * * * *